3,400,011
METHOD OF COATING WATER-SOLUBLE PARTICLES

Richard C. Fox, San Rafael, Calif., assignor to Chevron Research Corporation, a corporation of Delaware
No Drawing. Filed Sept. 30, 1964, Ser. No. 400,561
3 Claims. (Cl. 117—100)

ABSTRACT OF THE DISCLOSURE

A method of coating water soluble particles such as chemical fertilizers by projecting these particles through a vertical curtain of a molten thermoplastic coating material such as various waxes and organic resins. The particles to be coated are from about $1/20$ to $3/8$ inch average diameter.

---

This invention relates to a method of coating water-soluble particles with thermoplastic materials. More particularly, it relates to a method of applying substantially uniform coatings to solid particulate bodies by passing them through a curtain coating apparatus.

It is quite often desired to apply thin coatings of resinous materials to small particles such as pellets, etc. Of particular interest is the application of coatings to water-soluble materials, especially chemical fertilizers, that will allow slow-disposal of the materials through the soil when leached by water. Such coated particles are the subject of my copending U.S. patent application Ser. No. 399,855, filed Sept. 28, 1964 and now U.S. Patent No. 3,372,019.

Coatings of the type described have been applied by various methods, for example, by melting the coating composition, stirring the particles into the molten material and then separating the particles from the mixtures. Also, spraying of the particles by the molten material has been employed. However, each of the known methods is subject to several disadvantages, namely, an inability to provide a uniform coating and to regulate with precision the thickness of the applied coating. These factors are of primary importance in the preparation of slow-release materials. Uniform coating is important because the presence of thinly coated or uncoated areas allows too rapid release of the material into the soil, etc. Regulation of coating thickness is important both because of the desirability of regulating release time and because of the high costs of excessively thick coatings.

It has now been found that uniform coatings of solid thermoplastic material may be applied to water-soluble particles to produce slow-release materials by a method which comprises forming a substantially vertical, continuous, unbroken curtain of molten thermoplastic material and impelling the water-soluble particles in a trajectory through the curtain at substantially right angles to the curtain. The relationship of the curtain and the trajectory are so adjusted that the coating cools and hardens before the particles fall to a collecting surface.

Thermoplastic materials are those that are rendered soft and moldable by the action of heat. Those materials which are suitably applied by this coating method include any of a number of materials which have been employed for the preparation of slow-release materials. For example, the coating can be prepared from natural waxes, such as beeswax, etc.; petroleum waxes, including paraffin wax; microcrystalline waxes and their mixtures; and asphaltic materials. Organic resins may also be used. Included among these are various homopolymers and copolymers; as for example homopolymers of low molecular weight olefins; examples of such homopolymers being polyethylene, polypropylene, etc. Typical copolymers are reaction products of unsaturated esters with low molecular weight alpha olefins. Other examples of coating materials which may be applied by this method include polymers of vinyl chloride, vinylidene chloride, vinyl esters, styrene, alkyl styrenes, acrylate esters and methacrylate esters. Noncrystalline resins are preferred. It is preferred that the material have a softening point above 140° F. as storage of particles coated with materials of lower softening points is complicated by their tendency to cohere. The upper limit of softening points is about 400° F. because of decomposition problems encountered above that temperature.

The coating process in detail is as follows: The coating material is melted and discharged through an orifice, as for example between two adjustable blades, so that the material forms a substantially vertical curtain which is many times broader than its thickness. A typical coating apparatus is described in U.S. Patent No. 3,067,060. A receptacle is ordinarily provided beneath the curtain to collect the material from which receptacle the material is returned to recycle through the curtain.

In one preferred method, the curtain formed is of substantially rectangular shape; however, other shapes may be suitably employed, for example cylindrical curtains may be employed with the pellets being passed through the curtain from the interior of the cylinder.

The coating material selected is heated to and maintained at a temperature high enough above its melting point to insure proper coating.

The particles to be coated are projected through the curtain by any suitable means. A belt mechanism is commonly employed and due to its ease of operation is preferred. In short the method involves positioning a driven endless belt mechanism in a substantially horizontal position adjacent to the curtain. The mechanism is rotated in such direction that a point on the upper surface of the belt approaches the curtain. The particles are continuously fed onto the surface of the belt which is driven at such a speed that the particles when leaving the end of the belt near the curtain enter a trajectory which carries them through the curtain. The belt is usually inclined slightly upward in order that the trajectory intersects the curtain at an angle somewhat less than 90% in order that the downward force of the curtain is compensated and the particles remain in the trajectory for a sufficient time to permit hardening of the coating before the particles are collected.

Other methods of placing the particles into a trajectory may be suitably employed; for example, propulsion by compressed gases from a barrel or tube-type mechanism may be used. Further, expulsion by centrifugal force from a rotating cylinder may be used.

Particles of any shape may be coated by this method. For example, the particles may be spherical or nearly spherical, oblate, of various crystalline structures, angular, etc. The spherical or nearly spherical shapes are preferred as the coating is easier and may often be effected by one pass through the coater. Angular shaped particles may require two, and even three, passes.

The particles which may be coated by the method of this invention are from about $1/20''$ to $3/8''$ average diameter. The preferred range of particles will pass through a No. 4 mesh screen but will not pass through a No. 12 mesh screen. The preferred range is represented by particles that will pass through a No. 5 mesh screen but not through a No. 10 mesh.

The velocity at which the particles are projected through the curtain will depend on the character of the thermoplastic material, especially upon its melting point, and the time required for the coating to harden. For example, when the speed is increased, the trajectory will be longer allowing a greater time for cooling.

The coating material should be maintained at a temperature sufficiently above the melting point of the material to assure that the curtain is liquid but unbroken. A temperature of about 30° F. above the melting point is usually the minimum required to produce proper coating. Thus, when run at a lower temperature (i.e., 10 to 30° F. above the melting point), the coating process produces numerous threads or thin fibers. The range of temperature of about 150° F. from 30° F. over the melting point of the material to about 180° F. above represents the preferred range. Above about 180° F. over the melting point the viscosity of most materials decreases to such an extent that the curtain produced will not coat properly. Also, at temperatures near 400° F., many organic materials which may be employed begin to decompose thus making the coating unsatisfactory.

The following examples illustrate the coating process of this invention:

Example 1

A coating material was prepared by melting together 70% by weight of a 160/165 AMP paraffin wax with 30% of a copolymer of ethlyene with vinyl acetate having a melt index of 2 to 4. A 6" wide curtain was produced from the molten material which was maintained at 350° F., or about 190° F. above its melting point. Nearly spherical pellets of a commercial 16–16–8 garden fertilizer were coated. The pellets were of a size where all would pass through a No. 4 mesh screen and not through a No. 10 mesh. The pellets were projected through the curtain at a rate of 300 lbs./hr. The following data was obtained after one, two, and three passes of the pellets.

TABLE I

| No. of passes through coater | Percent coating by weight | Percent of pellets completely covered |
|---|---|---|
| 1 | 5–7 | 80 |
| 2 | 11–12 | 90–95 |
| 3 | 14–16 | 95–100 |

Example 2

A sample of fertilizer which comprises crystallized potassium chloride having an angular crystalline structure was coated by the procedure and with the coating of Example 1. The particles were of such size that they would pass through a No. 6 mesh screen but not through a No. 10 mesh. The following data were obtained from the procedure:

TABLE II

| No. of passes through coater | Percent coating by weight | Percent of pellets completely covered |
|---|---|---|
| 1 | 5–7 | 50–60 |
| 2 | 11–12 | 70–80 |
| 3 | 14–6 | 80–90 |

As can be seen from these data, the more angular material is more difficult to coat than the nearly spherical particles. However, adequate coating is obtained by three passes through the coater.

As previously mentioned, the method of coating exemplified by this invention is particularly applicable to producing slow-release particles such as fertilizers, etc. However, the invention is not to be considered as limited to the production of these materials, as the method is equally applicable to the production of numerous other coated particles, e.g., pills, etc.

What is claimed is:

1. The process of producing slow-release materials which comprises: forming a continuous substantially vertical, unbroken curtain of molten thermoplastic material, said thermoplastic material having a softening point between 140° and 400° F.; impelling water-soluble particles into a trajectory through said curtain wherein said particles are of such size that they will pass through a No. 4 mesh screen but not through a No. 12 mesh screen whereby the particles are coated with a substantially uniform coating of the thermoplastic material.

2. The process of claim 1 wherein the molten thermoplastic material is maintained at a temperature from about 30° to 180° F. above its melting point.

3. The process of claim 1 wherein the thermoplastic material comprises a mixture of wax and an organic polymer.

References Cited

UNITED STATES PATENTS

| | | | |
|---|---|---|---|
| 1,688,149 | 10/1928 | Massarella | 117—102 X |
| 2,197,792 | 4/1940 | Erickson | 118—303 X |
| 2,228,410 | 1/1941 | Sharma et al. | 99—156 |
| 2,413,491 | 12/1946 | Fajans | 117—100 X |
| 2,576,952 | 12/1951 | Lowe et al. | 117—100 X |
| 2,594,469 | 4/1952 | Mahoney | 117—105.3 X |
| 2,685,537 | 8/1954 | Dunmire | 117—100 X |
| 2,961,991 | 11/1960 | Girardi | 118—24 |
| 2,963,002 | 12/1960 | Glaus | 117—102 X |
| 3,021,779 | 2/1962 | Sollich | 118—24 X |
| 3,067,060 | 12/1962 | Glaus | 117—102 |
| 3,143,428 | 8/1964 | Reimers et al. | 117—100 X |
| 3,205,061 | 9/1965 | Mason | 117—100 X |
| 3,223,518 | 12/1965 | Hansen | 117—100 X |
| 3,295,950 | 1/1967 | Blouin et al. | 117—100 X |
| 3,303,816 | 2/1967 | Lauring | 117—102 X |
| 3,307,516 | 3/1967 | Wong et al. | 118—324 |

WILLIAM D. MARTIN, *Primary Examiner.*

E. J. CABIC, *Assistant Examiner.*